United States Patent
Martin et al.

(10) Patent No.: US 8,631,472 B1
(45) Date of Patent: Jan. 14, 2014

(54) TRIGGERS FOR SESSION PERSISTENCE

(75) Inventors: Geoffrey Scott Martin, Overland Park, KS (US); Michael Philip Dougan, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 152 days.

(21) Appl. No.: 13/195,072

(22) Filed: Aug. 1, 2011

(51) Int. Cl.
- *G06F 15/16* (2006.01)
- *G06F 9/26* (2006.01)
- *G06F 9/34* (2006.01)
- *G06F 15/173* (2006.01)

(52) U.S. Cl.
USPC ............ 726/4; 709/204; 709/205; 709/223; 711/209

(58) Field of Classification Search
USPC .......... 713/168–174, 182–186, 202; 709/225, 709/229; 726/2–8
See application file for complete search history.

(56) References Cited

U.S. PATENT DOCUMENTS

| | | | |
|---|---|---|---|
| 2009/0054068 A1 | 2/2009 | Halkka | |
| 2009/0093248 A1 | 4/2009 | Srinivasan | |
| 2009/0113039 A1* | 4/2009 | Savoor et al. | 709/224 |
| 2011/0246745 A1* | 10/2011 | Fukui et al. | 711/209 |
| 2013/0198011 A1* | 8/2013 | Corner et al. | 705/14.71 |

OTHER PUBLICATIONS

Wi-Fi Cellular Switching : VoIP cell phone roams between signals from GSM/GPRS or CDMA towers and short-range wireless broadband networks. Sep. 26, 2005.

* cited by examiner

*Primary Examiner* — Evans Desrosiers

(57) ABSTRACT

Methods, media, and servers are provided for maintaining persistent sessions for a network device and providing quick authorization to a user of the network device. The network server maintains persistent sessions with network devices based on a usage profile associated with the network devices. The persistent sessions are maintained during time periods when the network device experience peak transaction activity. Additionally, during these time periods, the network device may provide quick authorizations to users of the network device. Quick authorizations allow a transaction to complete on the network device without waiting for authorization if the user is identified as a returning user.

15 Claims, 4 Drawing Sheets

TRIGGERS FOR SESSION PERSISTENCE

SUMMARY

A high-level overview of various aspects of the embodiments of the invention are provided here for that reason, to provide an overview of the patent, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief, and at a high level, this patent describes, among other things, methods, systems, servers, and computer-readable media for determining whether persistent sessions should be maintained for a network device. A usage profile having transaction activity associated with the network device is stored in a database. In turn, a machine-to-machine (M2M) component may transmit stay-alive request to keep a persistent session open based on the peak frequency data and associated time periods identified for the network device. In certain aspects, the logic for determining whether to maintain persistent session may be performed via self-governance: the network device executes the logic, or via remote-governance: an external gateway or server executes the logic.

Moreover, in another aspect of the invention, the transaction requested by the user of the network device may benefit from quick authorization made available to the M2M component. When the user is identified as a returning user, the network device may immediately allow the transaction without waiting for authorization. Otherwise, the user may have to wait for the authorization before the transaction is completed.

BRIEF DESCRIPTION OF THE SEVERAL VIEWS OF THE DRAWINGS

Illustrative embodiments of the invention are described in detail below with reference to the attached drawing figures, wherein.

DETAILED DESCRIPTION

Figure 1:
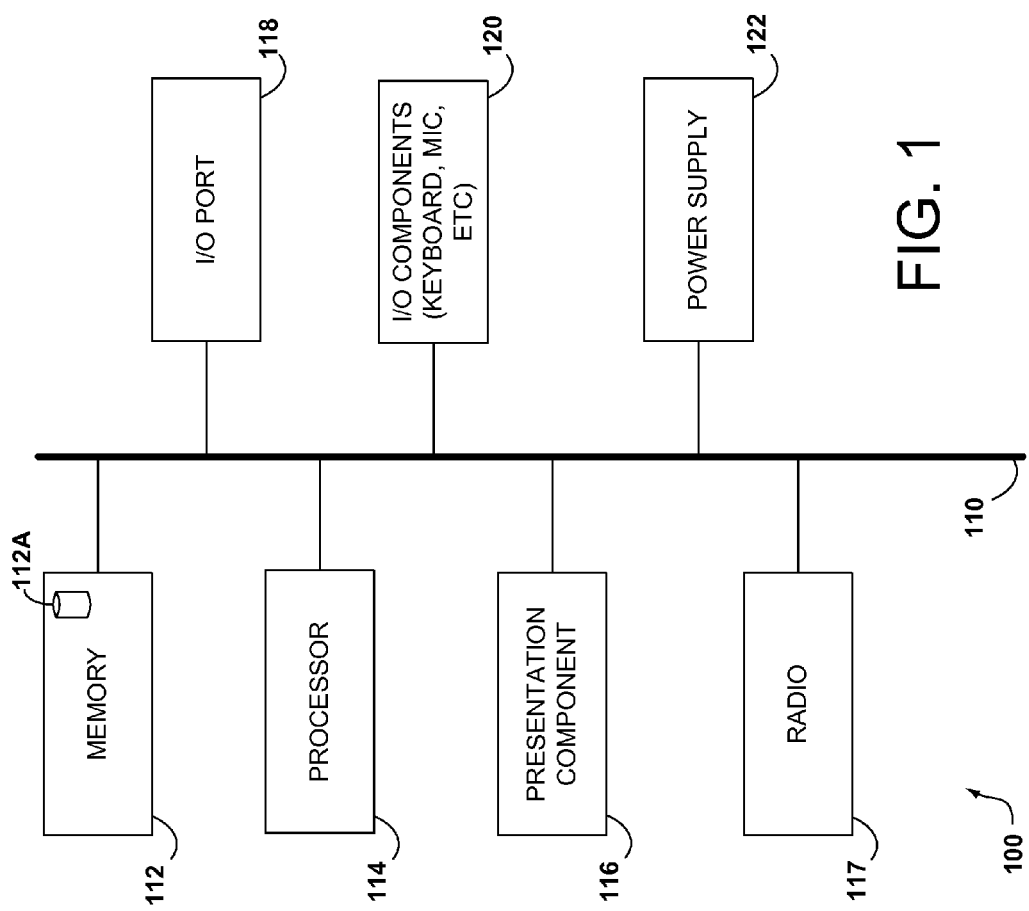
FIG. 1 depicts an illustrative device suitable for use in connection with embodiments of the invention.

The subject matter of the invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to network device configured with M2M components. The network devices may include smart meters, home appliances, washers, dryers, consumer electronics, vending machines, vehicle tracking devices, digital book, image and video recorders, etc. The M2M component provides the network devices with access to a communication network like a wireless network. Based on the applications executing on the M2M components, the network device may require persistent sessions with the communication network. Accordingly, activity associated with network device, may be tracked to create a usage profile and identify the periods during which the device benefits from the persistent session and to maintain the persistent sessions during the identified periods. For instance, when the current time on the network device falls within the identified periods, the persistent sessions are maintained. In other embodiments, the network device, in addition to maintaining the persistent session, may be configured to perform quick authorization based on whether the user is identified as a returning user.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

| | |
|---|---|
| AAA | Authentication, Authorization, and Accounting |
| ATM | Automated Teller Machine |
| BTS | Base Transceiver Station |
| CDMA | Code Division Multiple Access |
| GPRS | General Packet Radio Service |
| GSM | Global System for Mobile communications (Groupe Spécial Mobile) |
| IP | Internet Protocol |
| IPv4 | Internet Protocol Version Four |
| IPv6 | Internet Protocol Version Six |
| LED | Light Emitting Diode |
| M2M | Machine-to-Machine |
| PDA | Personal Data Assistant |
| RNC | Radio Network Controller |
| TDMA | Time Division Multiple Access |
| UMTS | Universal Mobile Telecommunications System |
| Wi-Fi | Wireless Fidelity |
| WiMAX | Worldwide Interoperability for Microwave Access |

Embodiments of the invention can take the form of a method, sever, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network device is configured with several input and output components. Additionally, an M2M component may be installed in the network device. The M2M component may include applications for communicating with a network. The M2M component may utilize the input and output component of the network device to implement operations requested by the applications of the M2M component.

FIG. 1 depicts an illustrative device suitable for use in connection with embodiments of the invention. Turning now to FIG. 1, a block diagram of an illustrative network device is provided and referenced generally by numeral 100. Although some components are shown in the singular, they may be plural. For example, network device 100 might include multiple processors or multiple radios, etc. A network device 100 may be one of many devices, including, but not limited to, a wireless phone, vending machine, video and image capture device, a laptop, a PDA, a handheld device, smart meters, vehicle tracking components, e-books, ATMs, consumer electronics, etc. As illustratively shown, network device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Memory component 112 can include any type of medium that is capable of storing information (e.g., a database 112A). The database 112A may be configured to store transaction activity, access patterns, and a usage profile associated with the network device 100. The database may also store applications associated with an M2M component installed on the network device 100. Processor 114 might actually be multiple processors that receive instructions associated with the applications and process the instructions accordingly. Presentation component 116 includes the likes of a display, a speaker, as well as other components that can present information (such as a lamp (LED), or even lighted keyboards).

The M2M component utilizes the communication interfaces of network device 100 to receive data from network resources on the communication network. In an embodiment, an application on the M2M component processes the transaction activity and access patterns of the network device to establish a usage profile for the network device. The usage profile includes data on for each day or week that can dictate when session persistence is to be toggled on or off based on current time and the historical peak activity for the network device 100. When the activity on the network device 100 falls below a specified threshold, the session persistence is terminated and a new session must be created with each transaction request or access request. In another embodiment, the M2M component executes a quick authorization application. The quick authorization application is configured to determine whether a user of the network device 100 is a returning user. When the M2M components identifies the user as a returning user, the network device 100 may immediately allow the transaction without waiting to establish a connection to the network or waiting for authentication. Thus, the network device 100 may open the network connection and receive the authorization for the transaction after the transaction is completed.

In some embodiments, the network resources on the communication network may be a server, a database, or an authorization component that provides the network device 100 with an indication of whether to maintain a persistent session or whether to authorize a transaction requested by the user. The communication interface may be a radio 117 that facilitates communication with a wireless telecommunications network. Illustrative wireless telecommunications technologies include CDMA, GPRS, TDMA, GSM, WIMAX, LTE, UMTS, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network device 100. Power supply 122 includes items such as batteries, fuel cells, or any other component that can act as a power source to power network device 100.

Accordingly, a network device 100 may toggle on and off session persistence based on a usage profile. Alternatively, a network resource may ignore stay-alive requests received from the network device 100 based on the usage profile associated with the network device 100. The persistent sessions may be maintained based on the usage profile and business rules associated with the network device 100. It will be understood and appreciated by those of ordinary skill in the art that the network device 100 shown in FIG. 1 is merely an example of one suitable network device 100 and is not intended to suggest any limitation as to the scope of use or functionality of the embodiments of the invention. Neither should the network device 100 be interpreted as having any dependency or requirement related to any single component or combination of components illustrated therein. The single unit depictions are meant for clarity, not to limit the scope of embodiments in any form.

A network device may execute wireless applications that rely on session persistence to enhance overall user experience. Some applications on the M2M component request "always on" connections to minimize the wait-time associated with establishing a connection to a network resource. The applications that request "always on" connections may cause the network device to transmit stay-alive requests, e.g., pings, periodically like every 1 to 2 seconds. Forcing an ever-persistent session on the connection may improve customer experience, but the burden on the network increases significantly as additional network device install M2M components that request their own "always on" connections. Establishing a usage profile for the network device may reduce the burden on the network by allowing the network device to experience an always on connection when it's needed most, e.g., during periods of peak activity.

Figure 2:
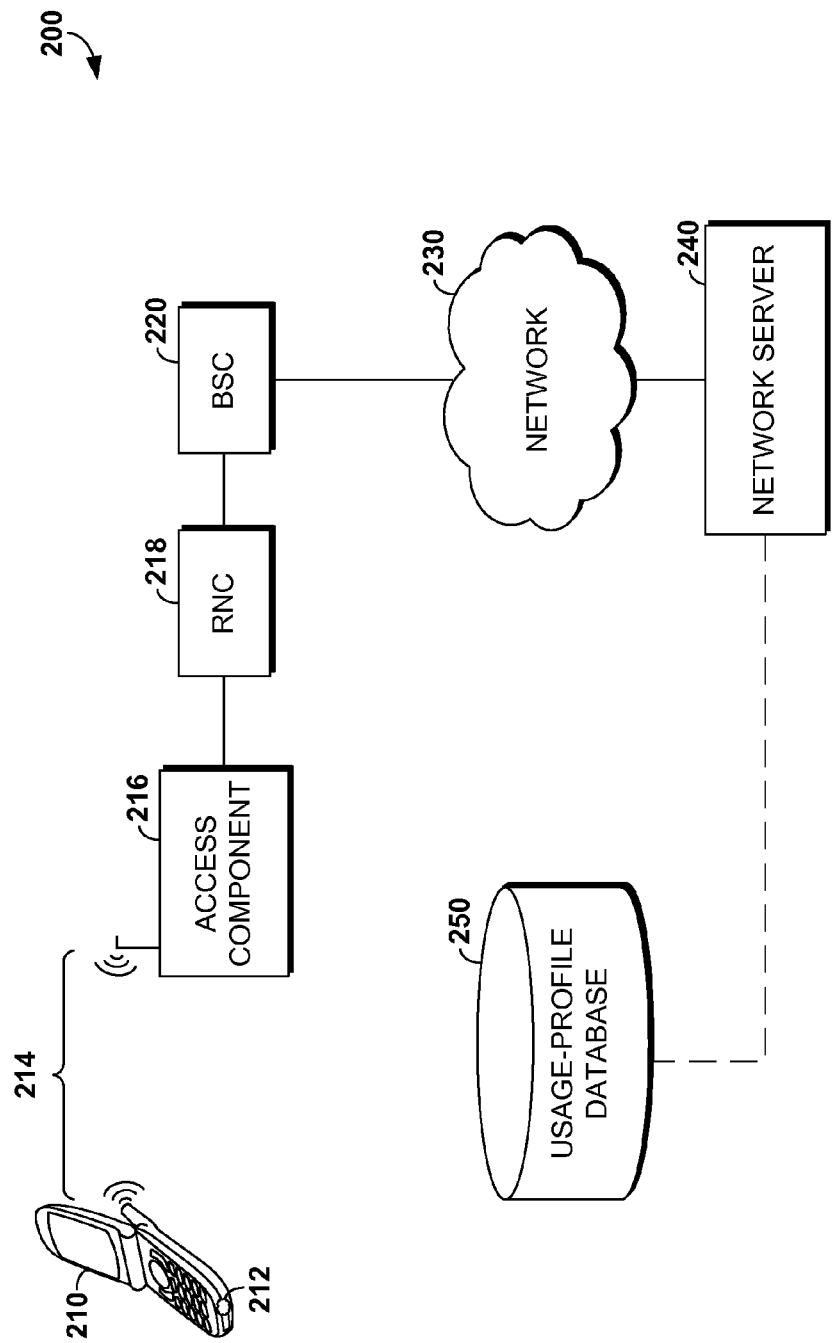
FIG. 2 depicts an illustrative communication system suitable for practicing embodiments of the invention.

FIG. 2 depicts an illustrative communication system suitable for practicing embodiments of the invention. Turning now to FIG. 2, an illustrative communication system is provided and referenced generally by the numeral 200, which depicts an illustrative operating environment for toggling session persistence utilized by a network device and for providing quick authorization to the network device. The communication system may include a network device 210, access components 216, RNC 218, BSC 220, network 230, network server 240, and usage-profile database 250.

Network device 210 executes a M2M application 212 that toggles session persistence and that provides quick authorization. In one embodiment, the M2M application 212 utilizes a usage profile to determine whether to toggle off session persistence. The M2M application 212 may, also, utilize data received from the network server 240 to determine whether quick authorization is available for a transaction.

Network device 210 communicates with an access component 216 by way of a communications link 214. Communications link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network 230. The access component 216 may be one or more of a base transceiver station (BTS) tower, a Wi-Fi Router, and any other device that facilitates communication between network device 210 and network 230. In one embodiment, the access component 216 includes both a Wi-Fi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC 220 acts as the intelligence behind base transceiver stations (BTS) (not shown), and handles allocation of radio channels, receives measurements from network devices, and controls handovers from one BTS to another BTS.

The components illustrated in FIG. 2, such as those that may be included in a wireless communications network 230 include the usage-profile database 250, a network server 240, and an authentication component. The network server 240 may, in certain embodiments, provide the network device 210 with access to the usage-profile database 250. The network server 240 may also include, or access, an authentication component that ensures network device 210 is authorized to complete a transaction pending on the network device 210.

The usage-profile database 250 stores transaction activity, access activity, and a usage profile of the network device 210. The usage profile provides a snapshot of historical information, including days, hours, and seconds associated with peak activity on the network device 210. In some embodiments, the usage-profile database 250 may be stored locally on the network device 210. In other embodiments, the usage-profile database 250 is a remote network resource that is accessible via the communication network 230. Accordingly, the usage profile database 250 may be utilized to identify peak periods of activity associated with the network device 210. The peak times, for instance, may be 8-10 AM and 10-11 PM based on transaction or access frequency. In other embodiments, the usage profile database 250 is used to store various attributes associated with network devices 210, such as IP addresses. Generally, an IP address is a numerical label that is assigned to devices in a network that use the Internet Protocol for communication between its attached devices. An IP address identifies the host and network interface and location addressing. In embodiments of the invention, an IP version four (IPv4) or IP version six (IPv6) address is allocated to a network device 210.

The authentication component is an authentication, authorization, and accounting (AAA) component of the network server 240. Alternatively, the network server may access the AAA server to receive authorization information. The AAA server is generally responsible for authorizing a network device to perform a given activity, such as logging onto an application or service, verifying transaction information, authenticating a network device on the network, and providing accounting services, such as tracking the consumption of network resources by network devices 210.

Generally, in this disclosure, when we speak of transmitting data or information we are referring to any action that requires network device 210 to have an IP address in order to carry out some action. Network device 210 might attempt to access items such as the Internet as well as other network resources that might alone or in combination facilitate things such as, paying bills, viewing account activity, television reception, e-mail reception, picture mail, video mail, video conferencing, shopping, and the like.

For instance, a network device 210 may request authorization for credit card transactions. If a persistent session is not available for authorization, the network device 210 may establish a connection to the wireless network 230 and authenticate the credit card. When approval is received the customer is allowed to make the purchase. In some embodiments, the purchase is allowed by the network device without waiting for the authorization if the user is identified as a returning user. The network device may identify the user a returning user based on activity stored in the usage-profile database 250.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

In one embodiment, the network device may benefit from a quick authorization where the network device allows the transaction to complete without authorization. For instance, a user may swipe a credit card to rent or purchase a product. Because, the user is a returning user, the network device may allow the authorization to complete without waiting for authorization from the network server that provides authorization for the user. The network device may be configured with thresholds that limit the number of quick authorization allowed per user, per day, or per year, etc.

Figure 3:
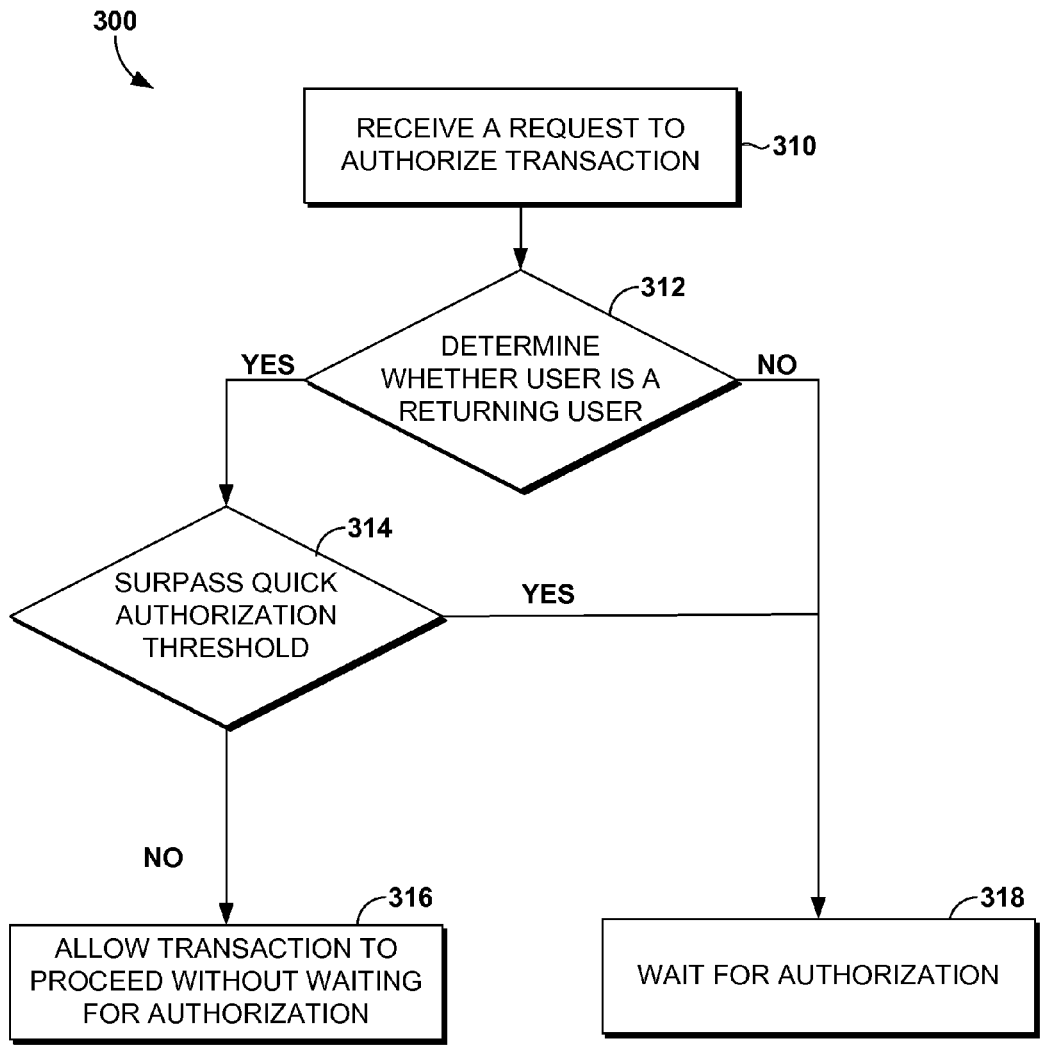
FIG. 3 depicts a flow diagram illustrating a method for providing quick authorization in accordance with embodiments of the invention.

FIG. 3 depicts a flow diagram 300 illustrating a method for providing quick authorization in accordance with embodiments of the invention. In step 310, the network device receives a request to authorize a transaction from a user. The request may include a user identifier and credit card information. In step 312, the network device determines whether the user is a returning user. The network device may access a local storage to determine how often the user accesses or request transactions at the network device. In one embodiment, the local storage may be a database having the transaction frequency associated with the user.

If the user requests transactions above a specified threshold, e.g. 6 times a week, the user may be identified as a returning user. In some embodiments, the network device may check whether quick authorization is available for the returning user in step 314. For instance, the network device may include a limit on the number quick authorization allowed on the device per day, to each user, etc. The network device verifies that limits associated with network device or the user are not surpassed. If quick authorization is available, the network device may allow immediate authorization of the user's transaction, in step 316. The network device, in certain embodiments, checks the credit information to confirm that is the same credit information, e.g. issuer, expiration date, and last 4 digits, the user previously entered in the prior transactions. If the credit card information is same and the user is a returning user, the network device temporarily stores the user information, including the credit information and immediately authorizes the transaction without waiting for an authorization response. In the meanwhile, the network device opens a connection to the authentication component and requests authentication of the credit information. If the credit information is different, the user is not a returning user, or quick authorization is not available, the network device waits for authorization, in step 318. The authorization may be received from the authorization component and the quick authorization transaction is validated or the network device is allowed to complete the transaction if it is waiting for the response from the authorization component.

Accordingly, returning users—that utilize the same payment mechanisms for each transaction—may benefit from quick authorization at the network device. In some embodiments, a network server may count the returning users at all network devices and generate a threshold for each network device that is calculated as a percentage of transactions divided by the number of network devices. For instance, the percentage of all transaction may be 10% or 15%. In other embodiments, the threshold for quick authorizations is a number based on volume and approval returns at the specific network device. For instance, the threshold may specify that for every 100 different returning users at the network device, 15% of the returning users may receive the benefit of quick authorization. Further still, in other embodiments, the quick authorization thresholds may be specified in days, weeks, or months. For instance, 10 quick authorizations per day, 30 per week, 60 per month or 1 quick authorization transaction per user per day.

In yet another embodiment, the network device is also configured to maintain persistent sessions with the communication network. The network device may toggle on and off periodic transmission of stay-alive requests based on the usage profile associated with network device. The persistent sessions may improve user experience when utilizing the network device.

Figure 4:
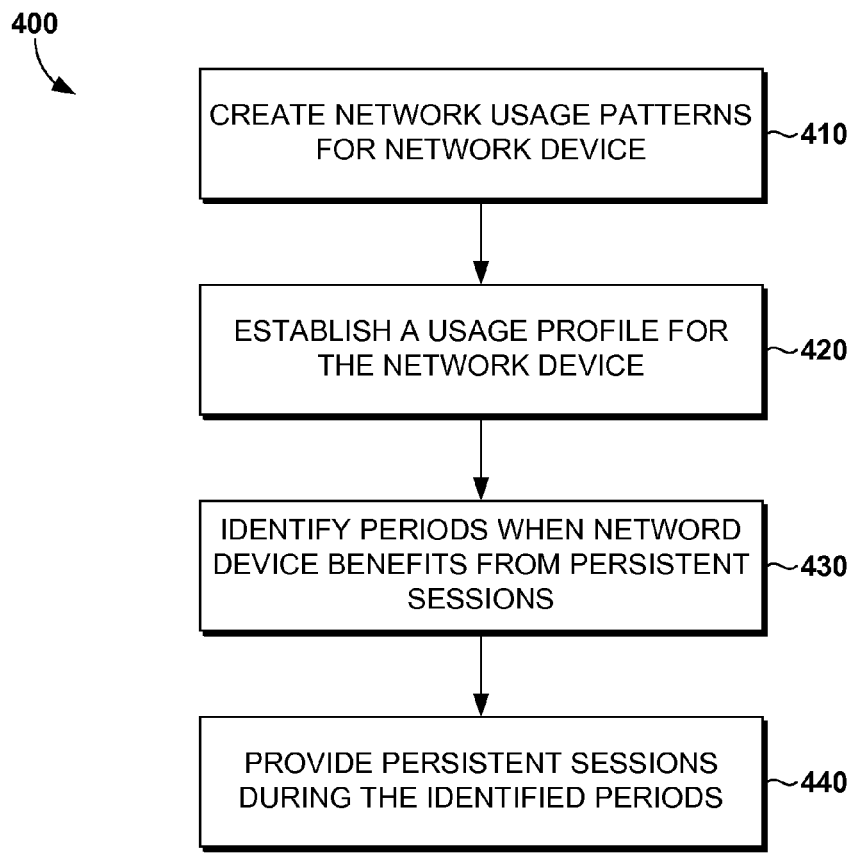
FIG. 4 depicts a flow diagram illustrating a method for providing persistent sessions to a network device in accordance with embodiments of the invention.

FIG. 4 depicts a flow diagram 400 illustrating a method for providing persistent sessions to a network device in accordance with embodiments of the invention. The method may be executed locally by the network device or remotely by a network server. The network device is one of a vending machine, a media player, an image capturing device, or a wireless device. In step 410, network usage patterns for the network device are created, where the usage patterns include access patterns for a communication network. The usage patterns may also include transaction data.

In turn, in step 420, a usage profile for the network device is established based on the usage patterns. Time periods when the network device would benefit from session persistence based on access frequencies in the usage patterns are identified in the usage profile, in step 430. The usage profile may specify peak time periods when the access or transaction frequency is above a specified threshold and low periods when the access or transaction frequency is below the specified threshold. The time periods may be specified in increments like seconds, hours, days, months. In certain embodiments, the usage profile is stored in a database.

In step 440, persistent sessions for the network device during the identified time periods are provided. The persistent sessions may be maintained in response to periodic requests received from the network device. For instance, the persistent sessions to the communication network during the identified time periods are maintained by the network server if the network server periodically receives stay-alive requests from the network device when the current time is within the identified time periods. The persistent session provides the network device with access to network resources on the communication network without having to establish a new connection to communication network.

In summary, a M2M component on the network device or a network server may function as gatekeepers. The gatekeepers attempt to effectively manage the stay-alive requests generated by the M2M component and provide persistent sessions to the network device when needed. For instance, transaction requests may be logged in database to create a usage profile for the network device. The network device or network server may utilize the usage profile to toggle on or off session persistence. In addition the usage profile may also be utilized to determine whether to provide the network device with quick authorization.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method to manage session persistence for a network device, the method comprising:
   creating network usage patterns for a network device, wherein the usage patterns include access patterns for a communication network;
   establishing a usage profile for the network device based on the usage patterns;
   identifying time periods in the usage profile when the network device would benefit from session persistence based on access frequencies in the usage patterns;
   providing persistent sessions for the network device during the identified time periods when the network device's usage pattern is above a specified threshold; and
   denying persistent sessions for the network device when the network device's usage pattern is below the specified threshold.

2. The method of claim 1, wherein the network device is a vending machine.

3. The method of claim 1, wherein the network device is a media player.

4. The method of claim 1, wherein the network device is an image capturing device.

5. The method of claim 1, wherein the network device is a wireless device.

6. The method of claim 1, wherein the usage patterns include transaction data.

7. The method of claim 1, wherein the persistent sessions are maintained in response to periodic requests received from the network device.

8. The method of claim 1, wherein the usage profile specifies peak time periods when the access frequency is above the specified threshold and low periods when the usage frequency is below the specified threshold.

9. The method of claim 8, wherein the usage profile is stored in a database.

10. A network server configured to provide session persistence to a network device, the server comprising:
one or more processors configured to receive network usage patterns for a network device, wherein the usage patterns include access patterns to a communication network, to establish a usage profile for the network device based on the usage patterns, to identify time periods in the usage profile when the network device benefits from session persistence based on access frequencies in the network usage patterns; and granting permission for the network device to establish persistent sessions to the communication network during the identified time periods, wherein the usage profile specifies peak time periods when the access frequency is above a specified threshold and low periods when the usage frequency is below the specified threshold and the peak time periods are selected as the identified time periods for session persistence.

11. The network server of claim 10, wherein the persistent session provides the network device with access to network resources on the communication network without having to establish a new connection to communication network.

12. The network server of claim 10, wherein the time periods are specified in increments.

13. The network server of claim 12, wherein the time increments are one of: seconds, hours, days, or months.

14. The network server of claim 10, further comprising a database configured to store the usage patterns for the network device.

15. The network server of claim 10, wherein the persistent sessions to the communication network during the identified time periods are maintained by the network server if the network server periodically receives stay alive requests from the network device.

* * * * *